United States Patent Office 2,911,365
Patented Nov. 3, 1959

2,911,365

DRILLING MUD CONTAINING A TELOMER

Peter D. Burland and Robert G. Roth, La Marque, Tex., assignors to Monsanto Chemical Company, St. Louis, Mo., a corporation of Delaware No Drawing. Application April 4, 1955
Serial No. 499,242

8 Claims. (Cl. 252—8.5)

This invention relates to aqueous dispersions of finely divided solid materials. More particularly this invention relates to the use of telomers of acrylic acid, its salts and acrylamide, as dispersing agents for finely divided solid materials in an aqueous medium.

This application is a continuation in part of application Serial No. 470,514, filed November 22, 1954, and application Serial No. 451,074, filed August 19, 1954, both now abandoned.

Many applications require the suspension or dispersion of finely divided solid materials in an aqueous medium. In such applications, it is customary to add dispersants to the composition. Dispersants facilitate the preparation of a uniform or homogeneous dispersion of the finely divided solid material throughout the aqueous vehicle. Satisfactory dispersants must not only accomplish this primary function, but also in so doing must not adversely affect the viscosity of the composition.

The preparation of aqueous dispersions of pigments and the preparation of drilling muds employed in the rotary method of drilling oil or gas wells constitute two of the more significant applications of aqueous dispersions of finely divided solid materials. While these two applications will be treated in detail, this invention is not limited thereto.

It is an object of this invention to provide improved aqueous dispersions of finely divided solid materials.

It is a particular object of this invention to provide improved aqueous dispersions of finely divided pigments.

It is also an object of this invention to provide improved aqueous dispersions or suspensions of clays having particular utility in drilling muds.

It is another object of this invention to provide a method of controlling the viscosity of aqueous drilling muds without adversely affecting other properties such as gel strength and filtration rate.

A still further object of the invention is to provide an aqueous drilling fluid having controlled viscosity.

Other objects will become apparent from the description of the invention.

It has now been discovered that significantly improved aqueous dispersions of finely divided solid materials can be prepared by incorporating therein a minor amount of a telomer of acrylic acid, its alkali metal or ammonium salts, or acrylamide and a halogenated alkane, said telomers containing the monomeric unit having the formula

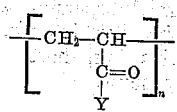

wherein Y may be $NH_2$, OH or OM, M being a cation selected from the group consisting of the alkali metals or ammonium and $n$ is an integer from 2 to 30. For convenience, hereinafter these telomers are referred to as acrylic telomers. Particularly useful aqueous dispersions of finely divided solid materials can be prepared by incorporating therein a minor amount of an acrylic telomer having the formula

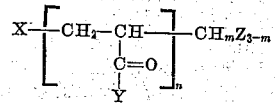

wherein X may be hydrogen or a halogen, Y may be $NH_2$, OH, or OM, M being a cation such as an alkali metal or ammonium, Z is a halogen, $n$ is an integer from 2 to 30, and $m$ may vary form 0 to 2 inclusive.

These telomers are disclosed and claimed in our copending application Serial No. 499,241, filed April 4, 1955, now Patent No. 2,868,837.

These acrylic telomers have proven to be particularly useful in the preparation of aqueous dispersions of pigments and in the preparation of aqueous dispersions of clays to be used as drilling muds.

In the manufacture of paints, practically all pigments employed, particularly inorganic pigments, are prepared or processed in aqueous media and are initially recovered as a pulp or paste. In the preparation of aqueous pigment pulps themselves as well as in the dry grinding of pigments intended for water dispersion, surface active agents are often used to improve the degree of dispersion. The degree of dispersion of the pigment has a strong influence on the rheological properties of the paint as well as upon its covering power. Materials used in the prior art for dispersing pigments have been many and varied and have included, for example, naphthalene sulfonates, proteins, lignin sulfonates, fatty alkyl sulfates and quaternary ammonium compounds. It has now been discovered that acrylic telomers are particularly effective dispersing agents for pigments. The acrylic telomers are characterized as products which by their presence act to prevent flocculation or agglomeration of solid particles of pigment suspended in water. In contrast to the compounds so employed in the prior art, smaller amounts of the acrylic telomers are required to promote a comparable degree of dispersion in pigments. With most dispersants, further addition after maximum thinning has been attained is characterized by an immediate increase in viscosity. This is not the case, however, with the thinners of the present invention since maximum thinning is maintained over a wider range of dispersant concentration and the likelihood of overtreatment is, therefore, minimized. The latter are also more desirable than those of the prior art for the reason that they maintain a constant low level of viscosity over a much wider solids concentration range. They thus have the advantage of permitting the preparation of suspensions of much higher solids concentration per given quantity of dispersing agent.

In accordance with the invention, the dispersion of a pigment, particularly an inorganic pigment, suspended in an aqueous medium may be readily effected by incorporating in said suspension a small quantity of an acrylic telomer. Consequently, the invention is also considered as encompassing a composition of matter which is a mixture comprising a finely-divided pigment suspended in an aqueous vehicle and a sufficient amount of an acrylic telomer to maintain the viscosity of the mixture at a desired level.

The acrylic teleomer dispersing agents of the invention are effective generally with all pigments. Of the many in existence which can be dispersed in aqueous medium using the thinning agents described herein are ferric oxide, iron blues, red lead, white lead (basic carbonate), white lead (basic sulfate), lead chromate, zinc oxide, zinc chromate, zinc sulfide, lithopone, chromium oxide, titanium dioxide (anatase), titanium dioxide (rutile), antimony oxide, cadmium sulfide, lead titanate, and the like. They are also useful with extended pigments such as titanium-barium, titanium-calcium, titanium-magnesium, zinc sulfide-barium, zinc sulfide-calcium, and zinc sulfide-magnesium pigments or with any combinations of pigments used to provide pigments of other than the primary colors such as lead chromate-lead oxide for making lighter shades of chrome orange, and iron blue and lead chromate for making chrome greens.

The quantity of dispersing agent to be used depends, of course, on the degree of dispersion desired or, in other words, the consistency or fluidity desired, the particle size of the dispersate, and the concentration of the dispersion. In general, from 0.05% to 5% by weight of the dispersing agents of the invention based on the dispersate will give good results. This applies to all types of dispersates, whether or not they be pigments. The acrylic telomer dispersing agent may be added to the pigment suspension as an aqueous solution or as a solid in powdered form or it may be incorporated as a dry solid with the dry pigment in the grinding or milling operation. Alternatively, the dispersion and mixing may take place simultaneously by intimately mixing the pigment with water and the dispersing agent.

The invention is illustrated in the following examples but these are not to be construed as limiting it in any manner except as it is limited in the appended claims. Viscosimetric measurements have been employed for evaluating dispersing action. The viscosity of the system is measured and the fluidity of the sample is taken as an indication of the relative degree of dispersion based on the commonly accepted conception that for the same concentration of solids under similar conditions, the more fluid is the sample, the more completely dispersed are the suspended particles. The Stormer viscosimeter was employed in obtaining the data given here.

EXAMPLE 1

A 50% suspension of pigment-grade iron oxide (Mapico Red No. 567—Ribelin Co., Houston, Texas) in water was prepared by stirring 150 grams of the pigment in 150 grams of water at high-speed for 5 minutes in a standard mixer. The viscosity of the suspension was measured. Small increments of a 10% aqueous solution of the sodium salt of a teleomer of acrylic acid and carbon tetrachloride in which the acid telomer had a molecular weight of 1490 were then added with one-minute stirring after each addition. Viscosity measurements were made after each addition of the dispersing agent. The data presented in Table I below illustrate the effectiveness of the teleomer as a dispersing agent.

*Table I*

| Telomer Dispersant Added (g.) | Conc. of Dispersant (Wt. Percent of Pigment) | Viscosity at 600 r.p.m. Stormer (cps.) |
|---|---|---|
| 0.0 | 0.0 | >300 |
| 0.025 | 0.016 | >300 |
| 0.050 | 0.033 | >300 |
| 0.075 | 0.050 | >300 |
| 0.10 | 0.066 | 29 |
| 0.15 | 0.10 | 18 |
| 0.21 | 0.14 | 7 |
| 0.235 | 0.156 | 7 |
| 0.285 | 0.190 | 7 |

EXAMPLE 2

The experiment of Example 1 was repeated on a fresh 50% iron oxide suspension with the exception that a 10% solution of a commercial sodium lignosulfonate dispersing agent was used instead of the acrylic acid telomer. The data obtained are presented in Table II below.

*Table II*

| Lignosulfonate Dispersant Added (g.) | Conc. of Dispersant, Wt. Percent of Pigment | Viscosity at 600 r.p.m. Stormer (cps.) |
|---|---|---|
| 0.0 | 0.0 | >300 |
| 0.025 | 0.016 | >300 |
| 0.050 | 0.033 | >300 |
| 0.075 | 0.050 | >300 |
| 0.10 | 0.066 | >300 |
| 0.15 | 0.10 | >300 |
| 0.20 | 0.133 | 63 |
| 0.25 | 0.167 | 43 |
| 0.30 | 0.20 | 21 |
| 0.35 | 0.233 | 8 |
| 0.40 | 0.267 | 8 |

A comparison of these data demonstrates that the acrylic acid telomers of the invention are such good dispersing agents for inorganic pigments that they are actually superior to a representative dispersing agent with less of the telomer being required to achieve optimum fluidity in the system.

EXAMPLE 3

Two samples of 50% suspensions of pigment-grade zinc oxide (ZnO No. 33, American Zinc, Lead and Smelting Co., Joplin, Mo.) were prepared by stirring 150 g. of the pigment in 150 g. of water respectively at high speed for five minutes in a standard mixer.

Incremental quantities of the acrylic acid telomer employed in Example 1 were added to one of the samples with one minute stirring after additions and viscosity measurements were made after each addition. The same procedure was followed with the second sample except that a representative sodium lignosulfonate commercial dispersing agent was employed as the thinning agent. The data obtained are presented in Table III below.

*Table III*

| | Sample No. 1 | | | Sample No. 2 | |
|---|---|---|---|---|---|
| Telomer Dispersant added (g.) | Conc. of Dispersant, Wt. percent of Pigment | Viscosity at 600 r.p.m. Stormer (cps.) | Lignosulfonate Dispersant Added (g.) | Conc. of Dispersant, Wt. percent of Pigment | Viscosity at 600 r.p.m. Stormer (cps.) |
| 0.0 | 0.0 | >300 | 0.0 | 0.0 | >300 |
| 0.16 | 0.106 | 56 | 0.16 | 0.106 | >300 |
| 0.20 | 0.133 | 11 | 0.20 | 0.133 | 150 |
| 0.30 | 0.200 | 11 | 0.325 | 0.216 | 66 |
| 0.40 | 0.268 | 11 | 0.405 | 0.270 | 41 |
| 0.50 | 0.333 | 11 | 0.525 | 0.350 | 14 |
| 0.60 | 0.400 | 11 | 0.765 | 0.510 | 14 |
| 0.80 | 0.533 | 11 | 1.765 | 1.175 | 10 |
| 1.0 | 0.665 | 11 | | | |

The effectiveness of the telomers of the invention as dispersing agents for pigments is evident from the above data. Maximum thinning of the zinc oxide suspension is obtained with only 0.13 wt. percent (based on the pigment) of the acrylic acid telomers as compared to the 1.18% of the commercial dispersing agent required. The dispersing agents of the invention are, therefore, roughly ten times more effective than those known to the art in these zinc oxide suspensions.

EXAMPLE 4

The experiment of Example 3 was repeated in every detail but with pigment-grade titanium oxide (Titanox RA from the Titanium Pigment Corp., South Amboy, N.J.). Results are tabulated below in Table IV.

Table IV

| Sample No. 1 | | | Sample No. 2 | | |
|---|---|---|---|---|---|
| Telomer Dispersant Added (g.) | Conc. of Dispersant, Wt. percent of Pigment | Viscosity at 600 r.p.m. Stormer (cps.) | Lignosulfonate Dispersant Added (g.) | Conc. of Dispersant, Wt. percent of Pigment | Viscosity at 600 r.p.m. Stormer (cps.) |
| 0.0 | 0.0 | >300 | 0.0 | 0.0 | >300 |
| 0.04 | 0.026 | >300 | 0.04 | 0.027 | >300 |
| 0.08 | 0.053 | 24 | 0.08 | 0.053 | >300 |
| 0.10 | 0.066 | 8 | 0.10 | 0.066 | >300 |
| 0.16 | 0.106 | 8 | 0.16 | 0.106 | >300 |
| 0.20 | 0.133 | 8 | 0.20 | 0.133 | 75 |
| 0.42 | 0.266 | 8 | 0.30 | 0.20 | 10 |
| | | | 0.54 | 0.36 | 10 |

Here again, as with the zinc oxide, the thinning agents of the invention are five or six times more effective than the commercial thinner at maximum thinning value. Much less of the telomer dispersing agent is required to produce a comparable degree of dispersion.

EXAMPLE 5

In order to further demonstrate the efficiency of acrylic telomers as dispersing agents, the highest solids content slurry that could be obtained using the maximum concentration of dispersing agent shown for the titanium dioxide suspensions in Example 4. This was done by adding incremental quantities of 10 grams of the powdered pigment to the 50% suspensions containing the maximum concentration of both the telomer dispersant (0.266%) and the sodium lignosulfonate dispersant (0.36%), stirring these for one minute at high speed and measuring the viscosity of the resulting slurries. Results obtained are tabulated below in Table V.

Table V

| System | TiO₂ Added (gram) | Viscosity (cps.) | Solids Conc. (Wt. Percent) |
|---|---|---|---|
| TiO₂-H₂O-Telomer | 0 | 8 | 50 |
| Do | 50 | 14 | 57.1 |
| Do | 100 | 24 | 62.5 |
| Do | 150 | 30 | 66.7 |
| Do | 170 | 97 | 68.1 |
| Do | 180 | >300 | 68.8 |
| TiO₂-H₂O-Sodium Lignosulfonate | 0 | 10 | 50 |
| Do | 50 | 41 | 57.1 |
| Do | 70 | 97 | 59.5 |
| Do | 80 | >300 | 60.5 |

These data demonstrate conclusively that the dispersing agents of the invention are highly effective and make possible the preparation of dispersions with high solids content and low viscosity. Further, they supply evidence of their superiority over other representative agents in the art.

While the preceding Examples 1–5 have illustrated the use of the sodium salt of a telomer of acrylic acid and carbon tetrachloride, comparable results are obtained if this telomer is replaced with the sodium salt of a telomer of acrylic acid and chloroform or dichloromethane.

In another specific embodiment of this invention, acrylic telomers are used to prepare drilling muds having exceptional properties.

Drilling of an oil or gas well by the rotary method is performed by rotating a bit attached to the end of a hollow drill pipe, known as a drill stem, which extends downward through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then upward through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drilling hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump pressures and/or power consumption.

The properties of the drilling mud are changed during drilling because some of the strata traversed are composed of shales, clays, etc., which become dispersed in the fluid and produce a gradual increase in the viscosity of the drilling mud with continued use. Contamination by salt brines or as a result of cementing operations likewise causes undesirable increases in viscosity. The custom of using weighting materials, such as barytes or hematite, to increase the density of the mud also results in increased viscosity. If the viscosity is allowed to become too great, difficulties are encountered both in pumping the mud and in removing cuttings from the mud at the surface. Another serious problem with highly viscous fluids is that of "gas cutting." The gas from the formation or formations through which the well passes becomes entrained in the drilling fluid since it cannot readily escape in the surface pits and the fluid which is recirculated consequently has a lighter weight than is desired. This greatly lessens its effectiveness in holding back formation pressures and significantly increases the possibilities of a blowout. For these reasons, it is obvious that the consistency of the drilling mud must be carefully controlled.

In practice, reduction in viscosity may be achieved by dilution with water or by the addition of dispersants. The former method, while it may be satisfactory in specific instances, has many drawbacks and disadvantages and so the practice of adding various chemicals to drilling fluids to reduce viscosity has become more or less standard. A large number of chemicals such as pyrophosphates, polyphosphates, tannates, humates, and phytates have been employed in the prior art. In many cases, however, the extent to which a drilling fluid can be controlled by such chemicals is limited.

In accordance with the invention, the viscosity of an aqueous drilling fluid may be controlled efficiently by incorporating therein a sufficient amount of an acrylic telomer. The composition of the invention may be described briefly as a mixture comprising finely divided solid material, an aqueous vehicle in which the solid material is dispersed or suspended, and a sufficient amount of an acrylic telomer to maintain the viscosity of the fluid at the desired level.

The finely divided solid material of the invention may, of course, be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayey subsurface formations are drilled. Weighting material added to increase specific gravity such as barytes, iron oxide, calcium carbonate, silica and the like may also be included.

The aqueous medium may be fresh water such as is obtained from wells or streams; it may be salt water from the sea or from wells; it may even include oil-in-water emulsion, i.e., water which has become contaminated in some way with small quantities of oil, or to which such oil has been added to gain some desired advantage.

It is contemplated that the drilling muds of the invention may also contain other additives besides the acrylic telomers of the invention. Materials such as caustic, quebracho, lime, cement, gypsum and the like may be added to the drilling mud at the surface or may be encountered in subsurface formations during drilling operations.

The quantities of the acrylic telomers to be employed in the drilling mud of the invention will vary with circumstances over a reasonably wide range and the amount employed in a specific suspension or dispersion will depend on these circumstances and the characteristics of the material treated. Ordinarily, satisfactory results will be obtained with quantities ranging from 1 to 4 pounds of the acrylic telomer per 42-gallon barrel of drilling mud. On the other hand, in some cases where only small improvement in viscosity is desired, as little as 0.5 lb. of the additive per barrel of mud will produce the desired effect. Above about 4 lb. per barrel, the small increase in effect in most cases would not warrant the additional cost of the material. The use of larger amounts of the acrylic telomers, say in quantities up to 6 lb. per barrel, would not usually have any harmful effect on the mud. Excessive quantities, however, might lead to over-treatment, i.e., develop an increase in viscosity. The exact amount to be added depends, as previously pointed out, upon the particular mud and on the properties desired. This can be determined, as is the customary procedure for all such additives, by simple routine tests at the time the addition is made.

The following examples are presented to illustrate the invention.

EXAMLE 6

A synthetic drilling mud was prepared containing 35% solids suspended in water. On a dry basis, the solids consisted of 10 parts by weight of Tennessee ball clay, 1 part by weight of Bentonite and 4 parts by weight of Dixie bond clay. The "breakover" from sodium-base to lime-base fluid was achieved by adding 5 g. of hydrated lime for each 350 cc. of the suspension and varying amounts of an acrylic telomer. Mud samples were made with two different samples of acrylic telomers, designated in this and the following examples as Telomer No. 1 and Telomer No. 2, which were the sodium salts of telomers of acrylic acid and carbon tetrachloride in which the acid telomers had molecular weights of 1250 and 1890, respectively. The addition of caustic usually required in "breakover" was obviated in this case by the basic nature of the telomer thinner. The samples were then tested by means of the standard procedures given in "Recommended Practice for Standard Field Procedure for Testing Drilling Fluids" of the American Petroleum Institute, third edition, May 1950, to evaluate the effect of the telomers as thinners. Results of these tests are presented in Table VI.

*Table VI*

| Additive | Lb. additive per bbl. | Viscosity at 600 r.p.m. Stormer, cps. | Gel strength | | Filtration rate, cc. in 30 min. A.P.I. | pH |
|---|---|---|---|---|---|---|
| | | | 0 min. | 10 min. | | |
| Blank | 0 | Plastic¹ | Plastic | Plastic | 50 (5 min.) | 10.5 |
| Telomer No. 1 | 0.5 | do | do | do | 40 (3 min.) | 12.2 |
| Do | 1.0 | do | do | do | 79 (13 min.) | 12.0 |
| Do | 2.0 | 8 | 0 | 5 | 82.5 | 12.2 |
| Do | 4.0 | 7 | 0 | 0 | 24.5 | 12.2 |
| Do | 6.0 | 5 | 0 | 0 | 30.5 | 12.3 |
| Telomer No. 2 | 0.5 | Plastic | Plastic | Plastic | 39 (2 min.) | 12.1 |
| Do | 1.0 | do | do | do | 54.5 (5 min.) | 12.2 |
| Do | 2.0 | 20 | 15 | 20 | 90.5 | 12.4 |
| Do | 4.0 | 7 | 0 | 0 | 33.5 | 12.9 |
| Do | 6.0 | 8 | 0 | 0 | 21 | 12.9 |

¹Above 350 cps.

These data show that the addition of the acrylic telomers in quantities upwards of 1 lb. per barrel effects a drastic reduction in viscosity of the mud without adversely affecting its thixotropic properties or its filtration rate characteristics. In fact, the acrylic telomer additives tend to enhance these other properties as well.

EXAMPLE 7

Since it is important that the drilling mud be stable at the bottom-hole temperatures encountered in drilling which sometimes reach as high as 250° F., the mud compositions of Example 6 were subjected for 72 hours to a temperature of 300° F. and then retested by the same procedures used originally. The data obtained are presented in Table VII.

*Table VII*

| Additive | Lb. additive per bbl. | Viscosity at 600 r.p.m. Stormer, cps. | Gel strength | | Filtration rate, cc. in 30 min. A.P.I. | pH |
|---|---|---|---|---|---|---|
| | | | 0 Min. | 10 Min. | | |
| Blank | 0 | Plastic¹ | Plastic | Plastic | 50 (5 min.) | 10.5 |
| Telomer No. 1 | 0.5 | do | do | do | 58 (10 min.) | 10.5 |
| Do | 1.0 | 69 | 70 | 90 | 85.5 (25 min.) | 10.6 |
| Do | 2.0 | 6.5 | 0 | 0 | 47 | 10.8 |
| Do | 4 | 7.5 | 0 | 0 | 18 | 11.1 |
| Do | 6 | 13.0 | 0 | 0 | 9 | 11.2 |
| Telomer No. 2 | 0.5 | 107 | 50 | 70 | 82 (13.5 min.) | 10.4 |
| Do | 1.0 | 147 | 100 | 120 | 87 (20 min.) | 10.6 |
| Do | 2.0 | 6.5 | 0 | 0 | 51.5 | 10.7 |
| Do | 4.0 | 7.5 | 0 | 0 | 13.5 | 11.0 |
| Do | 6.0 | 17 | 0 | 0 | 8 | 11.1 |

¹Above 350 cps.

These data convincingly demonstrate that these telomers not only suffer no loss in their effectiveness as thinners but are actually more effective when the mud in which they are incorporated is subjected to elevated temperatures. The ability to maintain reduced viscosity under such severe temperature conditions is a highly advantageous property not to be found in most of the thinners of the prior art.

EXAMPLE 8

A so-called "gyp" mud was prepared by adding to a clay suspension containing 35% solids, 3.5 g. of gypsum for each 350 cc. of the suspension and varying quantities of the same acrylic telomers used in Example 6. The muds thus produced were tested to evaluate the telomers as thinners. The results of these tests are presented in Table VIII.

Table VIII

| Additive | Lb. Additive per bbl. | Viscosity at 600 r.p.m. Stormer, cps. | Gel Strength 0 Min. | Gel Strength 10 Min. | Filtration Rate, cc. in 30 Min. A.P.I. | pH |
| --- | --- | --- | --- | --- | --- | --- |
| Blank | 0 | Plastic [1] | Plastic | Plastic | ------- | 8.5 |
| Telomer No. 1 | 0.5 | 136 | 100 | 100 | 45.5 | 8.4 |
| Do | 1.0 | 147 | 100 | 120 | 44 | 7.9 |
| Do | 2.0 | 58.5 | 50 | 70 | 35.5 | 7.6 |
| Do | 4.0 | 30 | 0 | 130 | 15.5 | 8.0 |
| Do | 6.0 | 21 | 0 | 100 | 13 | 8.2 |
| Telomer No. 2 | 0.5 | Plastic | Plastic | Plastic | 50 | 8.8 |
| Do | 1.0 | ----do---- | ----do---- | ----do---- | 50.5 | 7.7 |
| Do | 2.0 | 58 | 40 | 70 | 33 | 7.7 |
| Do | 4.0 | 23 | 0 | 70 | 12 | 8.8 |
| Do | 6.0 | 21 | 0 | 20 | 8 | 8.9 |

[1] Above 350 cps.

Results here are comparable with those in Example 6, indicating that the thinners of the invention are not restricted to use with lime-base muds but are also effective with "gyp" muds.

EXAMPLE 9

The procedures carried out in Example 7 at 300° F. with the lime-base mud were repeated with the "gyp" mud of Example 8 containing the stated quantities of the telomers. Results are presented in Table IX.

Table IX

| Additive | Lb. Additive per bbl. | Viscosity at 600 r.p.m. Stormer, cps. | Gel Strength 0 Min. | Gel Strength 10 Min. | Filtration Rate, cc. in 30 Min. A.P.I. | pH |
| --- | --- | --- | --- | --- | --- | --- |
| Blank | 0 | Plastic [1] | Plastic | Plastic | ------- | 6.4 |
| Telomer No. 1 | 0.5 | 125 | 120 | 120 | 47.5 | 6.4 |
| Do | 1.0 | 77 | 70 | 70 | 50 | 6.5 |
| Do | 2.0 | 48 | 30 | 70 | 45 | 6.8 |
| Do | 4.0 | 21 | 0 | 100 | 23 | 7.3 |
| Do | 6.0 | 36 | 0 | 70 | 15 | 7.3 |
| Telomer No. 2 | 0.5 | 97 | 70 | 70 | 44 | 6.9 |
| Do | 1.0 | 76 | 50 | 70 | 50 | 6.9 |
| Do | 2.0 | 46 | 30 | 70 | 37 | 7.2 |
| Do | 4.0 | 24 | 0 | 50 | 8 | 7.7 |
| Do | 6.0 | 31 | 0 | 20 | 3.5 | 8.3 |

[1] Above 350 cps.

It is obvious from the above data that the viscosity of the "gyp" mud treated with these acrylic telomers is not significantly affected by subjection to elevated temperatures.

EXAMPLE 10

The viscosity reduced characteristics of the acrylic telomers were also determined with muds other than those in which the sodium content had been base exchanged with calcium. Table X shows the thinning effect of a 10% solution of the telomers described in Example 6 on a 350 cc. sample of the mud indicated.

Table X

| Type Mud | Additive | Amt. of Additive, cc. | Viscosity at 600 r.p.m. Stormer, cps. | Percent Reduction in Viscosity |
| --- | --- | --- | --- | --- |
| Sodium-base | Blank | 0 | 350 | 0 |
| Do | Telomer No. 1 | 2 | 350 | 0 |
| Do | ----do---- | 5 | 136 | 60.9 |
| Do | ----do---- | 10 | 41 | 88.3 |
| Do | Telomer No. 2 | 2 | 400 | 0 |
| Do | ----do---- | 5 | 400 | 0 |
| Do | ----do---- | 10 | 129 | 68 |
| Sea-water | Blank | 0 | 136 | 0 |
| Do | Telomer No. 1 | 2 | 300 | 0 |
| Do | ----do---- | 10 | 300 | 0 |
| Do | ----do---- | 20 | 13 | 90 |
| Do | Telomer No. 2 | 2 | 180 | 0 |
| Do | ----do---- | 10 | Plastic | 0 |
| Do | ----do---- | 15 | 24 | 82 |
| Do | ----do---- | 20 | 15 | 88 |
| 8% Wyoming Bentonite | Blank | 0 | 250 | 0 |
| Do | Telomer No. 1 | 2 | 107 | 56 |
| Do | ----do---- | 5 | 46 | 81 |
| Do | ----do---- | 10 | 46 | 81 |
| Do | ----do---- | 15 | 41 | 84 |
| 11% Texas Bentonite | Blank | 0 | 107 | 0 |
| Do | Telomer No. 1 | 2 | 64 | 40 |
| Do | ----do---- | 5 | 38 | 64 |
| Do | ----do---- | 10 | 31 | 71 |

From the foregoing it will be apparent that there has been provided by this invention an additive which may be used for the purpose of reducing viscosity of drilling fluids. While the specific results obtained in the treatment of various drilling fluids does, of course, vary somewhat depending upon the composition of the fluids, the thinner of the invention is advantageously employed with drilling fluids containing clays of divergent characteristics. Its beneficial effect on viscosity is obtained at little or no sacrifice in other important characteristics such as gel strength and filtration rate. In fact, its use often results in improvement in these latter characteristics as well, particularly in cases where the mud is subjected to elevated temperatures.

While the preceding Examples 6-10 have illustrated the use of a the sodium salt of a telomer of acrylic acid and carbon tetrachloride, comparable results are obtained if this telomer is replaced with the sodium salt of a telomer of acrylic acid and chloroform or dichloromethane.

The preceding examples have illustrated two specific applications of the acrylic telomers as dispersants.

Aqueous dispersions of other types of finely divided solid materials can be prepared using the acrylic telomers. Aqueous dispersions of adhesives, carbon black and cement are additional examples of dispersions that can be prepared by incorporating therewith a minor amount of acrylic telomer. Aqueous dispersions of cements are particularly improved by incorporating therewith acrylic telomer. As a specific example, a composition comprising water containing 78% by weight of finely divided Portland cement was a plastic mass, too thick to be pumped with conventional equipment. When 0.29% by weight of solids of a sodium salt of a telomer of acrylic acid and carbon tetrachloride, wherein the acid telomer had a molecular weight of 1400, was incorporated therein, the composition became exceptionally fluid, having a Fann viscosity of only 60.5 cps.

The reaction products used in this invention are neither simple addition products nor interpolymers. Interpolymers result from a number of molecules of each reactant entering into the polymer chain and the product is a high molecular weight polymeric material. In the reaction products of the invention, however, only one molecule of the halogenated alkane compound enters into the formation of each molecular species and the average molecular weight of the product is, in general, considerably lower than that of an interpolymer formed under comparable conditions. These compositions, therefore, have special properties not to be found in the conventional acrylic acid polymers of the prior art which make them particularly desirable in certain applications.

The following examples are presented to particularly illustrate a method by which the acrylic telomers used in this invention can be prepared. All parts given are by weight.

EXAMPLE 11

A stainless steel rocking autoclave of three-liter capacity was charged with 222.4 parts of acrylonitrile, 2577.6 parts of carbon tetrachloride and 3.3536 parts of benzoyl peroxide. The autoclave was sealed, heated to 100° C. and rocked at that temperature for approximately five hours. At the end of that time, the autoclave was opened and its contents were filtered through a Buchner funnel. The precipitated polymer was dried at a temperature of 80° C. for 36 hours to remove all traces of the chain transfer agent. The polymer product, a free-flowing buff-colored powder of low bulk density, contained 25.2% N by Kjeldahl analysis, had a molecular weight of 1390, i.e., a degree of polymerization of approximately 26, and a specific viscosity of 0.2532 as determined at 30° C. on a solution of 0.2 g. of the material in 50 ml. of dimethylformamide. A yield of 190.0 parts of the telomer was obtained.

A 100-gram sample of the telomer was slurried with 750 ml. of distilled water in a flask equipped with a stirrer, a thermometer and a reflux condenser. A solution of 73 g. of sodium hydroxide (98%) in 250 ml. of distilled water was added to the slurry with stirring while the flask was heated gently. The mixture was not permitted to boil until most of the solid material had gone into solution. It was then kept under reflux conditions for a period of about 11.5 hours with provision being made to allow the water vapor to escape in order to concentrate the sample. The resulting mixture of hydrolyzed telomer weighing 437.1 g. was analyzed and found to contain 51.4% $H_2O$ (Fischer method) and only 0.9% residual nitrogen on a wet basis. The viscous solution was a clear dark amber color. The molecular weight of the hydrolyzed telomer thus obtained was 1890 as calculated from the nitrile telomer from which it was derived.

A second sample of the same telomer was hydrolyzed by means of an alcohol-water-caustic slurry technique in order that the hydrolyzed product might be recovered in solid form by means of a simple filtration step. Approximately 47.1 g. (equivalent to 0.89 mole of acrylonitrile) of the telomer was charged with 200 g. of ethanol to a three-liter, triple-necked flask equipped with a stirrer, reflux condenser and thermometer. The stoichiometric quantity of sodium hydroxide required for hydrolysis, 35.6 g. (0.89 mole) dissolved in 41.0 g. of distilled water was then added and the mixture was stirred thoroughly until the solid material was well wetted. Heat was applied to bring the mixture to boiling and it was maintained under reflux conditions for about 14 hours. The mixture was then filtered, the precipitate was washed several times with absolute alcohol and dried overnight at 90° C. The yield of hydrolyzed telomer was 83.1 g. or 98.6% of the theoretical and the product contained 5.4% of residual nitrogen.

EXAMPLE 12

A mixture of 278 parts of acrylonitrile, 3,222 parts of carbon tetrachloride, and 17.682 parts of benzoyl peroxide was heated for 5 hours in a stainless steel rocking autoclave at a temperature of 100° C. The reaction mixture was filtered through a Buchner funnel and the polymeric precipitate was placed in an evaporating dish and dried for 8 hr. at 105° C. Approximately 244 parts of a telomer as a buff-colored, free-flowing powder was obtained, representing a yield of over 90%. The product had a molecular weight of 1100, representing an average degree of polymerization of about 18 or a structure corresponding to the formula

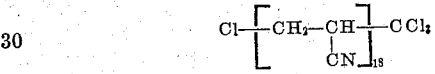

The specific viscosity of this telomer as determined at 30° C. on a solution of 0.2 g. in 50 ml. of dimethylformamide was 0.1671.

This telomer of acrylonitrile was hydrolyzed in an alcoholic caustic slurry in a manner similar to that described in Example 11. About 600 ml. of ethanol were placed in a 3-liter, triple-necked flask fitted with a thermometer, a reflux-condenser, and a stirrer with 120 g. (3 moles) of caustic dissolved in 135 g. of distilled water (7.5 moles) and 159 g. (equivalent to 3 moles of acrylonitrile) of the dried telomer was added slowly with stirring. The exothermic heat of solution of the caustic in water brought the temperature up to about 55–60° C. and the mixture was thoroughly stirred for about 20 minutes before any heat was applied. Then the temperature was brought up to boiling by means of a heating mantle and the whole was refluxed for a period of about 9 hrs. A portion of the alcohol was removed by distillation at an overhead temperature of 78.2° C. The mixture was filtered, the precipitate was washed with the distilled alcohol, and dried in an oven at 105° C. The yield of hydrolyzed product containing 4.55% of residual nitrogen and having a molecular weight of approximately 1642 was 273 g., or 96%.

EXAMPLE 13

Approximately 53 parts of acrylonitrile are charged with 588 parts of dichloromethane and 1.06 parts of tertiary butyl hydroperoxide to a rocking autoclave and heated at 120° C. for approximately 6 hours. Following the procedure described in Examples 11 and 12, there is recovered in good yield a low average molecular weight product similar in both appearance and physical properties to the acrylonitrile telomers in these other examples. Thereafter, using the technique of hydrolysis described in Examples 11 and 12 wherein hydrolysis is effected in an alcoholic medium, in this case isopropanol being employed, the acrylonitrile telomer is converted to an acrylic telomer having a molecular weight and properties very similar to those obtained in the other examples given above.

Many variations in procedure from those given in the examples both in the manner of preparation of the acrylic telomers and in the hydrolysis of them may be made. For example, any of the halogenated alkanes such as $C_2H_4Cl_2$, $C_2H_3Cl_3$, $C_2H_4Br_2$, $C_3H_6Cl_2$, $CHCl_3$, $CH_3F$, $CH_3I$, $CH_2I_2$, $CI_4$, $CBr_4$, $CHBr_3$, $CH_2Br_2$, $CH_3Cl$, etc., are as suitable as telogens as are the carbon tetrachloride and dichloromethane mentioned.

The mole ratio of the halogenated alkane to the nitrile may vary over the range from 1:1 to 10:1, for example, depending upon the molecular weight desired in the product. Generally, the molecular weight of the telomer formed decreases with an increase in the ratio of the halogenated alkane or chain transfer agent, to nitrile employed. Since the preferred molecular ratio will depend upon the desired chain length of the product, considerable latitude may be exercised in the choice of reactant quantities. There is, however, a limiting factor with regard to the excess of chain transfer agent used. Amounts greater than that represented by the 10:1 ratio, while they may be employed, serve no useful purpose and necessitate recovery of an excess quantity of the chlorinated transfer agent for economical reasons.

Catalysts or initiators of polymerization other than the benzoyl peroxide and tertiary butyl hydroperoxide mentioned may also be used. Generally, suitable materials for catalyzing the present process are free-radical-liberating agents, i.e., compounds which will decompose to give free radicals. Such compounds include peroxygen-type catalysts, for example, acyl peroxides such as acetyl, benzoyl, lauroyl or stearoyl peroxides; hydrocarbon peroxides or hydroperoxides such as di-tert.-amyl peroxide, tert.-butyl hydroperoxide, cumene hydroperoxide, p-cymene hydroperoxide, and inorganic percompounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead and the like. The quantity of catalyst useful for promoting the addition reaction may range from as little as 0.5% to as much as 5% by weight of the nitrile reacted. Usually, optimum yields are obtained with amounts of catalyst representing from 2–3% by weight of the nitrile employed. Quantities of more than 5% serve no useful purpose and may even cause detrimental side reactions, hence should not be used. Ultraviolet light may be employed with the catalyst or as the sole catalytic agent.

Neither reaction time nor reaction temperature is critical. The time during which the nitrile and halogenated alkane are reacted may be widely varied depending upon the reactant quantities, the reaction temperature used, the nature of the individual catalyst employed, etc. Generally, times of from one to twenty-four hours are employed. The telomerization reaction may be carried out over a wide range of temperatures from 50° C. to 150° C. or above. The preferred temperature depends primarily on the catalyst employed since the minimum temperature of the reaction is that required to decompose the catalyst and generate free radicals. When benzoyl peroxide is the catalyst, for example, the reaction is usually initiated at about 60° C. to about 100° C. while with di-tertiary butyl peroxide, reaction begins at about 100° C. to about 120° C. Optimum yields are generally obtained by operating at temperatures which permit steady decomposition of the catalyst, with consequent steady liberation of free radicals.

Conditions under which hydrolysis is effected may likewise be varied to some extent. Depending upon the product desired, for example, hydrolysis may be effected by means of either an acid or a base. Suitable acids are sulfuric acid and hydrochloric acid; while the alkali metal hydroxides such as sodium and potassium hydroxide and ammonium hydroxide, are suitable bases for the hydrolysis reaction. In acid hydrolysis, the cyanide, or CN, groups in the telomer are converted into either amide, $CONH_2$, or carboxyl, COOH, groups according to the extent of the hydrolysis, the amount of water employed being the main controlling factor. Complete hydrolysis yields the acid derivative, while the intermediate hydrolysis product is the amide. On the other hand, hydrolysis in the presence of a base yields a product wherein the nitrile group has been converted to the acid salt such as COONa, $COONH_4$, etc.

Generally, for complete hydrolysis, for each molecular part of telomer there is employed a molecular part of acid or base and two molecular parts of water. In hydrolyzing to the amide stage, however, only one mole of water and one mole of acid is required per mole of telomer. For practical purposes and to insure as complete hydrolysis as possible, water is usually employed in slight excess, for example, 2.5 moles per mole of telomer.

The hydrolyzing reaction occurs to a minor extent at room temperature but generally the application of some heat is required. Temperatures below 100° C. are employed with temperatures usually maintained at from about 40 to about 80° C. Preferred temperatures lie in the range from about 60 to about 70° C. The time required for the reaction varies with the temperature of the reaction being shorter for a higher temperature and longer for a lower temperature. When operating within the preferred temperature range, it has been shown that a reaction time between about 0.5 hour and about six hours is satisfactory, while a time from about three to about four hours is preferred. Extended periods of time in excess of those mentioned result in little variation in the residual nitrogen content of the finished acrylic telomer.

The product resulting from hydrolysis is usually an aqueous solution which may be used as such or from which the solid hydrolyzed telomer may be recovered. However, recovery is complicated by the fact that such large amounts of water must be evaporated since the telomers are produced in such dilute solutions. To obviate these problems, therefore, hydrolysis may be carried out in a medium which is non-solvent for both the acrylonitrile telomer itself and the hydrolyzed or acrylic telomer but which is miscible with water and the acid or base used. Many alcohols are useful for this purpose. In decreasing order of their utility, there may be mentioned, for example, ethanol, isopropanol or propanol, methanol, and ethylene glycol.

Depending upon the hydrolysis conditions employed, any and all of the following species of acrylic telomers as well as others not listed may be produced by hydrolysis of the corresponding acrylonitrile telomers, $n$ in each case being an integer from 2 to 30.

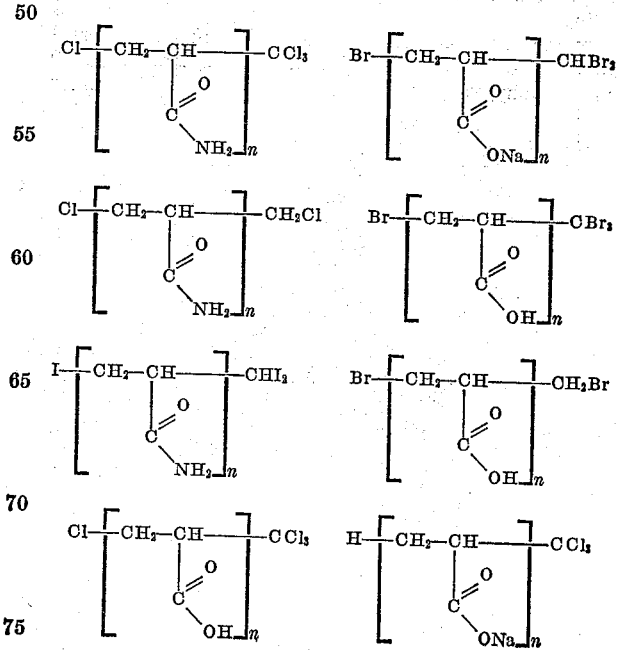

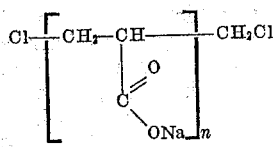

What is claimed is:

1. A drilling fluid comprising an aqueous suspension of clay containing a telomer of a monomeric material selected from the group consisting of acrylic acid, its alkali metal and ammonium salts and acrylamide, and a halogenated alkane, said telomers containing the monomeric unit having the formula

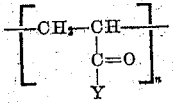

wherein Y is selected from the group consisting of OH, NH₂ and OM, M being a cation selected from the group consisting of the alkali metals and ammonium and $n$ is an integer from 2 to 30, said telomer being present in an amount sufficient to prevent flocculation of said finely divided solid material.

2. A drilling fluid comprising an aqueous suspension of clay containing a telomer of a monomeric material selected from the group consisting of acrylic acid, its alkali metal and ammonium salts and acrylamide, and a halomethane, said telomers containing the monomeric unit having the formula

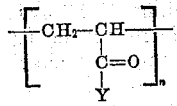

wherein Y is selected from the group consisting of OH, NH₂ and OM, M being a cation selected from the group consisting of the alkali metals and ammonium and $n$ is an integer from 2 to 30, said telomer being present in an amount sufficient to prevent flocculation of said finely divided solid material.

3. A drilling fluid comprising an aqueous suspension of clay containing a telomer having the formula

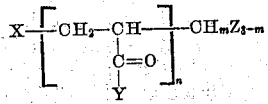

where X is selected from the group consisting of hydrogen and halogen, Y is selected from the group consisting of NH₂, OH and OM, M being a cation selected from the group consisting of the alkali metals and ammonium, Z is a halogen, $n$ is an integer from 2 to 30 and $m$ may vary from 0 to 2 inclusive, said telomer being present in an amount sufficient to prevent flocculation of said finely divided solid material.

4. A drilling fluid comprising an aqueous suspension of clay containing a telomer having the formula

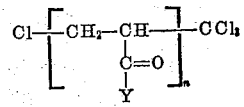

wherein Y is selected from the group consisting of OH, NH₂ and OM, M being a cation selected from the group consisting of the alkali metals and ammonium and $n$ is an integer from 2 to 30, said telomer being present in an amount sufficient to prevent flocculation of said finely divided solid material.

5. A drilling fluid as described in claim 4 wherein Y is OM and M is chosen from the group consisting of the alkali metals and ammonium.

6. A drilling fluid as described in claim 5 wherein M is sodium.

7. A drilling fluid comprising an aqueous suspension of clay containing a telomer of the formula

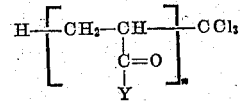

wherein Y is selected from the group consisting of OH, NH₂ and OM, M being a cation selected from the group consisting of the alkali metals and ammonium and $n$ is an integer from 2 to 30, said telomer being present in an amount sufficient to prevent flocculation of said finely divided solid material.

8. A drilling fluid comprising an aqueous suspension of clay containing a telomer of the formula

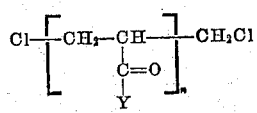

wherein Y is selected from the group consisting of OH, NH₂ and OM, M being a cation selected from the group consisting of the alkali metals and ammonium and $n$ is an integer from 2 to 30, said telomer being present in an amount sufficient to prevent flocculation of said finely divided solid material.

References Cited in the file of this patent

UNITED STATES PATENTS

| | | |
|---|---|---|
| 2,398,426 | Hanford | Apr. 16, 1946 |
| 2,552,775 | Fischer et al. | May 15, 1951 |
| 2,718,497 | Oldham et al. | Sept. 20, 1955 |
| 2,727,835 | Barrett | Dec. 20, 1955 |